US010508602B2

(12) United States Patent
Barton et al.

(10) Patent No.: US 10,508,602 B2
(45) Date of Patent: Dec. 17, 2019

(54) CORNER FLOW REDUCTION SEALS (71) Applicant: General Electric Company, Schenectady, NY (US)

(72) Inventors: Jesse Ellis Barton, Fountain Inn, SC (US); Richard Martin DiCintio, Simpsonville, SC (US); Elizabeth Angelyn Monaghan, Greenville, SC (US)

(73) Assignee: General Electric Company, Schenectady, NY (US)

( * ) Notice: Subject to any disclaimer, the term of this patent is extended or adjusted under 35 U.S.C. 154(b) by 584 days.

(21) Appl. No.: 15/254,037

(22) Filed: Sep. 1, 2016

(65) Prior Publication Data

US 2018/0058331 A1 Mar. 1, 2018

(51) Int. Cl.
*F02C 1/00* (2006.01)
*F02C 7/28* (2006.01)
*F01D 9/02* (2006.01)
*F02C 3/04* (2006.01)

(52) U.S. Cl.
CPC ............... *F02C 7/28* (2013.01); *F01D 9/023* (2013.01); *F02C 3/04* (2013.01); *F05D 2220/32* (2013.01); *F05D 2300/601* (2013.01)

(58) Field of Classification Search
CPC .......... F02C 7/28; F01D 9/023; F01D 11/005; F05D 2240/55; F05D 2300/601; F05D 2240/57; F23R 2900/00012
See application file for complete search history.

(56) References Cited

U.S. PATENT DOCUMENTS

| 5,265,412 | A | 11/1993 | Bagepalli et al. |
| 5,987,879 | A | 11/1999 | Ono |
| 6,450,762 | B1 | 9/2002 | Munshi |
| 6,547,257 | B2 | 4/2003 | Cromer |
| 6,588,214 | B2 | 7/2003 | Mack et al. |
| 6,834,507 | B2 | 12/2004 | Jorgensen |
| 7,481,037 | B2 | 1/2009 | Takaya et al. |
| 7,784,264 | B2 | 8/2010 | Weaver et al. |
| 7,797,948 | B2 | 9/2010 | Weaver et al. |

(Continued)

FOREIGN PATENT DOCUMENTS

EP 2 679 774 A1 1/2014

OTHER PUBLICATIONS

Wikipedia, Gas Turbine, Feb. 16, 2008 (Year: 2008).*

(Continued)

*Primary Examiner* — Craig Kim
*Assistant Examiner* — Edwin Kang
(74) *Attorney, Agent, or Firm* — Dority & Manning, P.A.

(57) ABSTRACT

A sealing arrangement for sealing between a first stage nozzle and a plurality of aft frames includes a first inner seal and a second inner seal which are circumferentially oriented and circumferentially aligned. Each of the inner seals includes a wing extending radially inward at an oblique angle. A side seal is radially disposed between the first inner seal and the second inner seal. The side seal includes a first wing extending radially outward at an oblique angle and a second wing extending radially outward at an oblique angle, the first wing of the side seal sealingly interfaces with the wing of the first inner seal and the second wing of the side seal sealingly interfaces with the wing of the second inner seal.

18 Claims, 8 Drawing Sheets

(56) References Cited

U.S. PATENT DOCUMENTS

| | | |
|---|---|---|
| 7,908,866 B2 | 3/2011 | Kato et al. |
| 8,141,879 B2 | 3/2012 | Venkataraman et al. |
| 8,562,000 B2 | 10/2013 | Moehrle et al. |
| 8,661,828 B2 | 3/2014 | Pieussergues et al. |
| 8,985,592 B2 | 3/2015 | Green et al. |
| 9,115,585 B2 | 8/2015 | Melton et al. |
| 2002/0121744 A1* | 9/2002 | Aksit ............... F01D 9/023 277/411 |
| 2004/0031271 A1 | 2/2004 | Jorgensen |
| 2006/0123797 A1 | 6/2006 | Zborovsky et al. |
| 2006/0127219 A1 | 6/2006 | Zborovsky |
| 2009/0322036 A1 | 12/2009 | Halling |
| 2010/0054928 A1 | 3/2010 | Schiavo |
| 2011/0014029 A1* | 1/2011 | Venkataraman ...... F01D 9/023 415/110 |
| 2011/0020113 A1 | 1/2011 | Beeck |
| 2011/0304104 A1 | 12/2011 | McMahan et al. |
| 2012/0085103 A1 | 4/2012 | Lacy et al. |
| 2012/0200046 A1 | 8/2012 | Green et al. |
| 2012/0280460 A1 | 11/2012 | Cihlar et al. |
| 2013/0161914 A1 | 6/2013 | Sarawate et al. |
| 2015/0184528 A1 | 7/2015 | Belsom |
| 2017/0342850 A1 | 11/2017 | Morgan et al. |

OTHER PUBLICATIONS

Extended European Search Report and Opinion issued in connection with corresponding EP Application No. 17187889.5 dated Jan. 25, 2018.

* cited by examiner

CORNER FLOW REDUCTION SEALS

FIELD OF THE TECHNOLOGY

The subject matter disclosed herein relates to a combustor for a gas turbine. More specifically, the disclosure is directed to a sealing arrangement for the interface of one or more combustor transition ducts with one or more inlets of a first stage nozzle of a gas turbine.

BACKGROUND

Gas turbines typically comprise several interconnected discrete parts. A gas turbine generally includes an inlet section, a compression section, a plurality of combustors, a turbine section, and an exhaust section. The inlet section may include a series of filters, cooling coils, moisture separators, and/or other devices to purify and otherwise condition a working fluid (e.g., air) entering the gas turbine. The working fluid flows downstream from the inlet section to a compressor section where kinetic energy is progressively imparted to the working fluid to produce a compressed working fluid at a highly energized state. The compressed working fluid is mixed with a fuel from a fuel supply to form a combustible mixture within one or more combustors. The combustible mixture is burned to produce combustion gases having a high temperature and pressure. The combustion gases flow through a turbine of a turbine section wherein energy (kinetic and/or thermal) is transferred from the combustion gases to rotor blades, thus causing a shaft to rotate and produce work. For example, the rotation of the turbine shaft may drive the compressor to produce the compressed working fluid. Alternately or in addition, the shaft may connect the turbine to a generator for producing electricity. Exhaust gases from the turbine flow through an exhaust section that connects the turbine to an exhaust stack downstream from the turbine. The exhaust section may include, for example, a heat recovery steam generator for cleaning and extracting additional heat from the exhaust gases prior to release to the environment.

The combustors of a gas turbine are generally coupled to the inlets of a first stage nozzle of the turbine section via transition ducts. Typically, each transition duct has an aft frame positioned adjacent to an inlet of the turbine section. The aft frame will usually have two arcuate portions which are typically referred to as inner and outer portions, being inner and outer in the radial direction with respect to the centerline axis of the turbine. The inner and outer portions of the aft frame are interconnected by radially extending linear portions, often referred to as side portions. Inner and outer circumferential seals are used to seal between the inner and outer portions of the aft frame and the corresponding inlet of the turbine section. Radially oriented side seals can be disposed between adjacent aft frames to substantially close and seal off the circumferential gaps between the side portion of one aft frame and the next aft frame.

The radially oriented side seals between circumferentially adjacent aft frames are axially offset (with reference to the turbine axis) from the inner and outer seals between each aft frame and the inlet. Because of this axial offset, gaps remain between the inner and outer seals and the side seals. Gas turbines usually burn hydrocarbon fuels and produce air polluting emissions such as oxides of nitrogen (NOx) and carbon monoxide (CO). Thus, gaps between the inner and outer seals and the side seals may lead to escape of working fluid (e.g., compressed air and/or combustion gases) flowing through the transition duct from the combustor to the first stage nozzle, which can cause lower performance and a shift in the emission of air pollutants.

BRIEF DESCRIPTION OF THE TECHNOLOGY

Aspects and advantages are set forth below in the following description, or may be obvious from the description, or may be learned through practice.

Improved sealing connections between the various parts of the gas turbine are desired in the art. In particular, gas turbines and associated sealing arrangements which facilitate a reduction or elimination of working fluid lost to the ambient atmosphere and/or emissions escaping to the ambient atmosphere would be advantageous.

One embodiment of the present disclosure is directed to a sealing arrangement for sealing between a first stage nozzle and a plurality of aft frames. The arrangement includes a first seal which is circumferentially oriented. The first seal comprises a forward surface, an aft surface and a wing extending radially inward at an oblique angle. The arrangement also includes a second seal which is circumferentially oriented adjacent to the first seal, the second seal comprising a forward surface, an aft surface, and a wing extending radially inward at an oblique angle. The second seal is radially and axially aligned with the first seal, and the wing of the second seal opposes the wing of the first seal and is circumferentially spaced from the wing of the first seal. The arrangement also includes a side seal radially disposed between the first seal and the second seal, wherein the side seal comprises a forward face and an aft face, a first wing extending radially outward at an oblique angle and a second wing extending radially outward at an oblique angle. The first wing of the side seal sealingly interfaces with the wing of the first seal and the second wing of the side seal sealingly interfaces with the wing of the second seal.

Another embodiment is directed to a gas turbine. The gas turbine includes a compressor, a turbine and a plurality of combustors disposed downstream from the compressor and upstream from the turbine. The combustors are circumferentially spaced around a central axis of the turbine. Each combustor includes an upstream end, a downstream end, and a transition duct which defines a flow path from the compressor to the turbine with an aft frame that circumferentially surrounds the downstream end of the transition duct. The aft frame comprises an inner portion radially separated from an outer portion and a pair of opposing side portions that extend radially between the inner portion and the outer portion. A first inner seal is disposed on the inner portion of a first one of the plurality of combustor aft frames and a second inner seal is disposed on the inner portion of a circumferentially adjacent one of the plurality of combustor aft frames to the first one of the plurality of combustor aft frames. A side seal is radially disposed between the first inner seal and the second inner seal. The first inner seal comprises a forward surface, an aft surface, and a first wing extending radially inward at an oblique angle. The second inner seal comprises a forward surface, an aft surface, and a second wing extending radially inward at an oblique angle, the second inner seal radially and axially aligned with the first inner seal, the second wing opposing and circumferentially spaced from the first wing. The side seal comprises a forward face and an aft face, a third wing extending radially outward at an oblique angle and a fourth wing extending radially outward at an oblique angle. The third wing sealingly interfaces with the first wing and the fourth wing sealingly interfaces with the second wing.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel to and/or aligned with an axial centerline of a particular component and the term "circumferentially" refers to the relative direction that extends around the axial centerline of a particular component.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a land based power generating gas turbine combustor for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Figure 1:
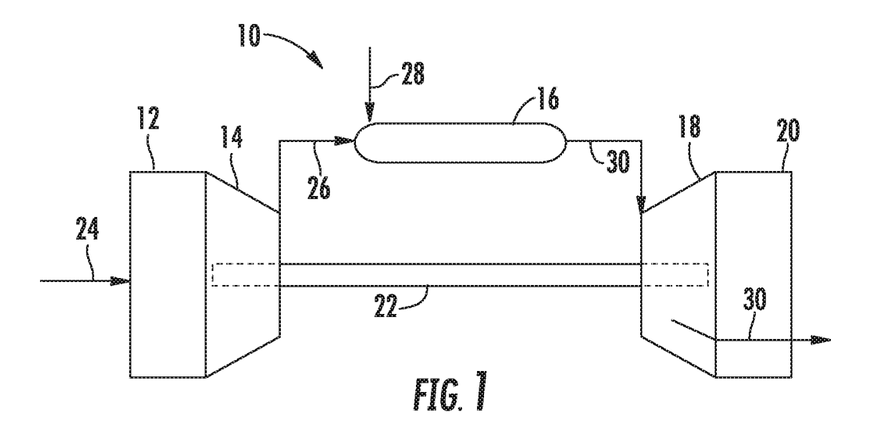
FIG. 1 illustrates a schematic diagram of an exemplary gas turbine that may incorporate various embodiments of the present disclosure.

Referring now to the drawings, FIG. 1 illustrates a schematic diagram of an exemplary gas turbine 10 that may incorporate various embodiments of the present invention. As shown, the gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
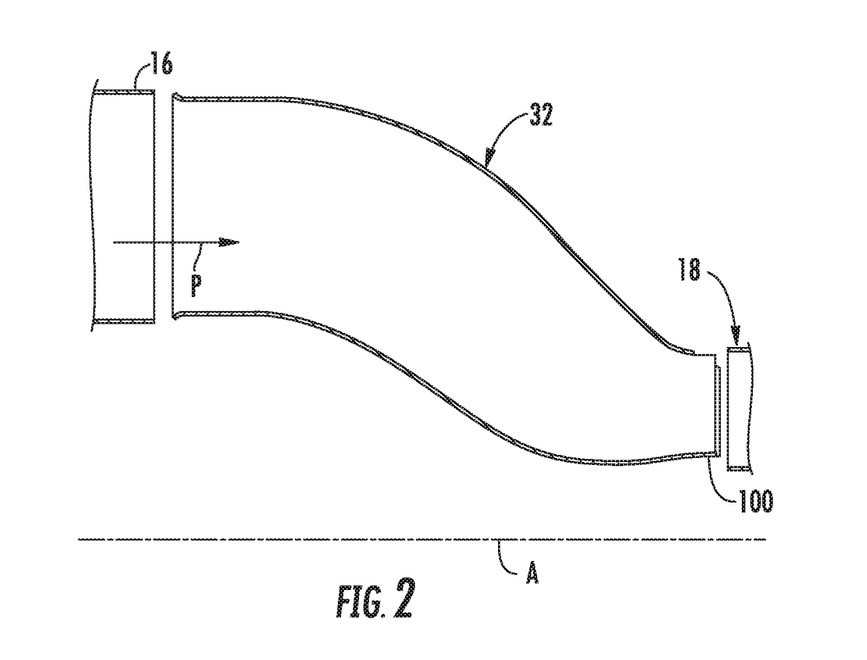
FIG. 2 illustrates a section view of a transition duct between a combustor and an inlet according to at least one embodiment.

As illustrated in FIG. 2, the combustor 16 may be connected to the turbine 18 via a transition duct 32 including an aft frame 100. The transition duct 32 defines a flow path P. Also shown in FIG. 2 is the central axis A of turbine 18, which defines an axial direction substantially parallel to and/or along axis A, a radial direction perpendicular to axis A, and a circumferential direction extending around axis A.

Figure 3:
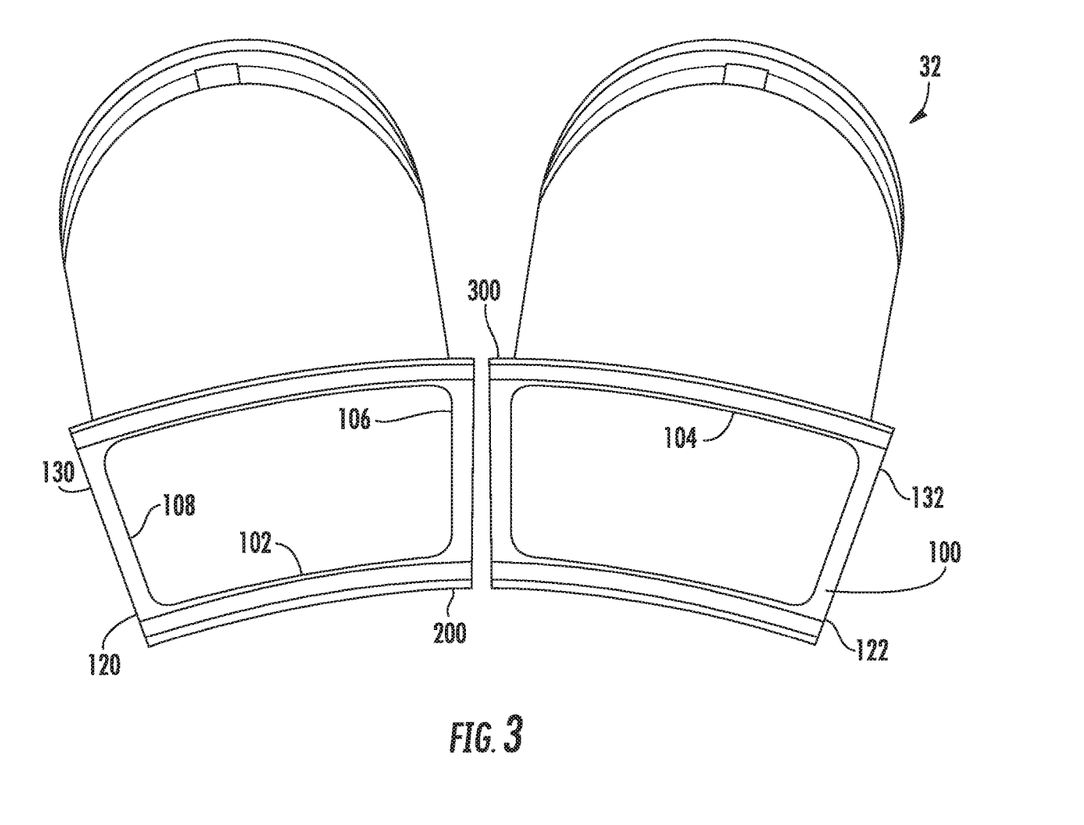
FIG. 3 is a perspective view of circumferentially adjacent aft frames which may incorporate various embodiments of the present disclosure.

Referring now to FIG. 3, a pair of circumferentially arranged transition ducts 32 are illustrated, each having an aft frame 100 that surrounds its respective downstream end. As illustrated in FIG. 3, in some embodiments, the aft frame may have an inner portion 102 and an outer portion 104, with a pair of opposing side portions 106 and 108 that extend radially between the inner and the outer portions 102 and 104. Also illustrated in FIG. 3 is an inner seal 200 and an outer seal 300 respectively disposed on the inner portion 102 and outer portion 104 of each aft frame 100. In the exemplary embodiment illustrated in FIG. 3, inner seal 200 and outer seal 300 are circumferentially oriented, each inner seal 200 is circumferentially aligned with the other inner seal 200 on the adjacent aft frame 100, and each outer seal 300 is circumferentially aligned with the other outer seal 300 on the adjacent aft frame 100. As illustrated in FIG. 3, the aft frame 100 may also include radially-extending side portions 106 and 108, the intersections of side portions 106 and 108 with inner portion 102 define inner corners 120 and 122, and the intersections of side portions 106 and 108 with outer portion 104 define outer corners 130 and 132. A radially oriented side seal 400 (see, e.g., FIG. 5) is disposed between the aft frames 100 and the inner and outer seals 200 and 300 disposed thereon. In the description herein, certain features of the aft frame 100 and seals, 200, 300, and 400 will be described with reference to one or both inner corners 120 and 122, nonetheless, it should be recognized by one of ordinary skill in the art that such features can be associated with any or all of inner corners 120, 122 or outer corners 130, 132.

Figure 4:
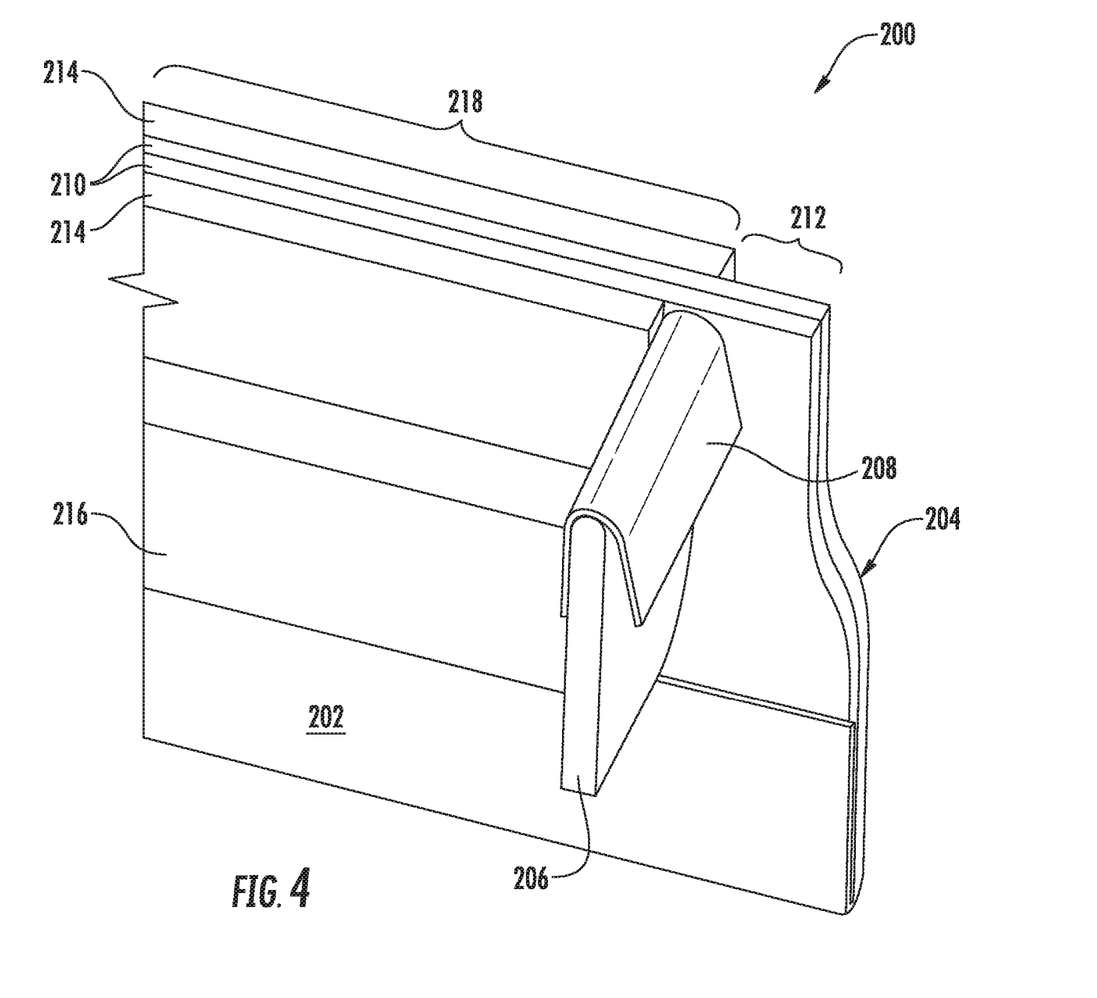
FIG. 4 is a perspective view of an exemplary circumferentially-oriented seal according to at least one embodiment.

FIG. 4 illustrates an exemplary circumferentially-oriented seal, which in some embodiments such as the example illustrated in FIG. 4, may be an inner seal 200, comprising a forward surface 202 and an aft surface 204. In some embodiments, a projection 206 may be provided on the forward surface 202, the projection 206 extending forward away from the inner seal 200 along the axial direction. A wing 208 may be provided at a radially outer portion of the projection 206. As illustrated in FIG. 4, the wing 208 may extend radially inward at an oblique angle, e.g., the wing 208 may extend from the projection 206 predominantly along the radial direction but at an angle that is oblique to the true radial direction such that the wing 208 extends along a direction with a relatively small circumferential component. In other embodiments, the circumferentially-oriented seal may also or instead be an outer seal 300 with similar features. Additionally, predictable variations may be incorporated in such alternative embodiments, such as but not limited to providing an outer seal 300 with wings that may extend in an essentially outward radial direction.

Circumferentially-oriented seals 200 and 300, such as for example inner seal 200 illustrated in FIG. 4, may be composed primarily of a cloth 210, which can be a woven mesh cloth of a suitable metal material, e.g., alloy L605. Additionally, inner seal 200 can include shims 214 and an elongate backing bar 216 to form a main body 218 of the inner seal 200. The materials of the main body 218 are layered, e.g., with the cloth 210 sandwiched between shims 214, as such, main body 218 may be considered as a layered main body or laminated main body. Further illustrated in the example embodiment of FIG. 4, a cloth extension 212 can be provided which extends beyond the shims 214 and backing bar 216 in the circumferential direction. The cloth extension 212 allows the inner seal 200 to interact (e.g., overlap) with an inner seal 200 on an adjacent aft frame 100 while also maintaining sufficient clearance between the layered main bodies 218 for installation of each inner seal 200. In some embodiments, such as is illustrated in FIG. 4, the projection 206 may be located at an end of the backing bar 216. In such embodiments, the projection 206 may define or coincide with a demarcation between main body 218 and cloth extension 212, such that wing 208 and cloth extension 212 are generally disposed in the same circumferential area. That is, although wing 208 and cloth extension 212 are not necessarily circumferentially coextensive, they may originate at about the same location along the circumferential direction while being axially adjacent (see, e.g., FIG. 8).

Figure 5:
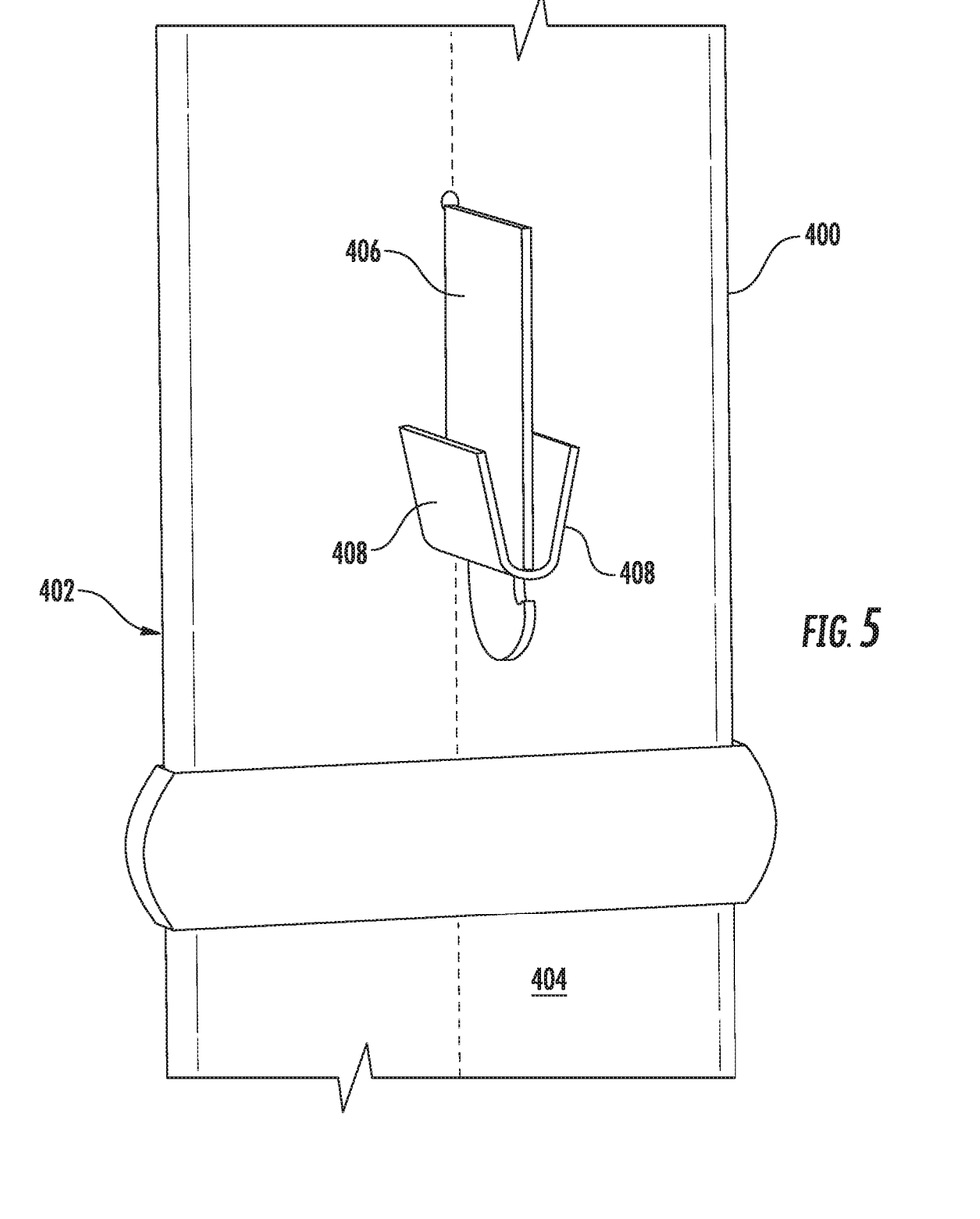
FIG. 5 is a perspective view of an exemplary side seal according to at least one embodiment.

As illustrated in FIG. 5, in some embodiments, the side seal 400 may include a forward surface 402 and an aft surface 404, and further may have a projection 406 that extends aft along the axial direction from the aft surface 404, with wings 408 extending radially outward from a radially inner portion of projection 406. Further illustrated in FIG. 5, in some embodiments wings 408 extend from projection 406 at an oblique angle, e.g., at an angle that is oblique to the true radial direction such that each wing 408 extends along a direction that is predominantly radial with a relatively small circumferential component.

Figure 6:
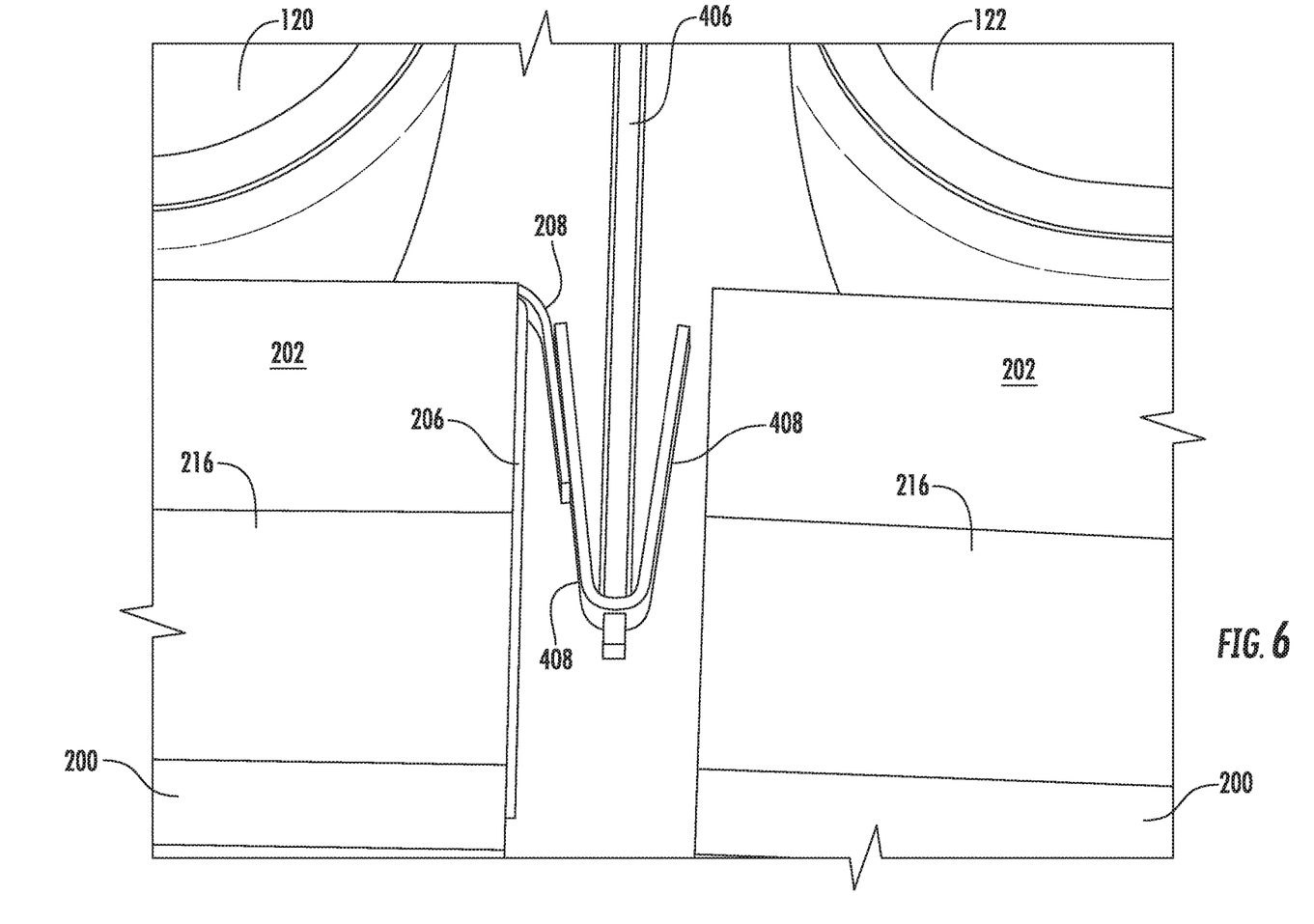
FIG. 6 is a partial perspective view of exemplary circumferential and radial seals according to at least one embodiment.

Turning now to FIG. 6, an exemplary pair of circumferentially adjacent aft frames 100 are illustrated with inner seals 200 disposed on inner portions 102 of the aft frames 100 and particular aspects of this exemplary embodiment are shown near inner corners 120 and 122 of the aft frames 100. The side seal 400 itself is not shown for sake of clarity in FIG. 6. FIG. 6 illustrates the interfacing relationship of wings 408 on the side seal projection 406 with the wing 208 of one of the inner seals 200, wherein wing 408 on the side seal 400 sealingly engages with the wing 208 on the inner seal 200 (a second wing 208 on the next adjacent inner seal 200 may also be provided, in which case the second wing 208 would essentially mirror the first wing 208 and would interface and sealingly engage with the other side seal wing 408).

Figure 7:
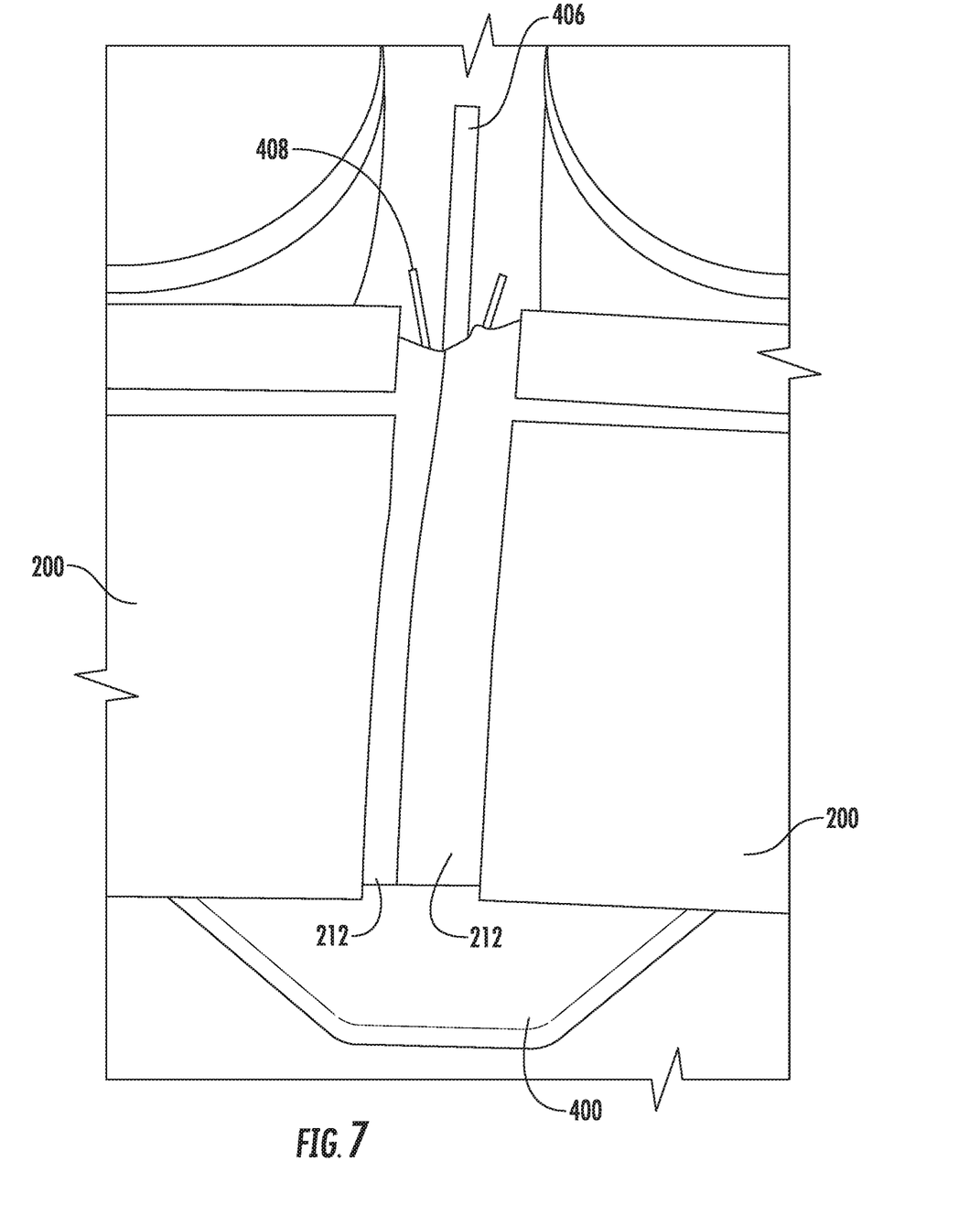
FIG. 7 is an axially oriented view of a partially assembled sealing arrangement according to at least one embodiment.

FIG. 7 illustrates a position of side seal 400 and in particular projection 406 thereon according to some exemplary embodiments when the disclosed sealing arrangement is nearly fully assembled. That is, the illustrated exemplary embodiment is shown in a position where the adjacent inner seals 200 are in place and positioned such that the cloth extensions 212 thereof overlap one another, while side seal 400 has not been fully inserted between inner seals 200 but is displaced outward along the radial direction from its fully installed position. As illustrated in FIG. 7, cloth extensions 212 can overlap to substantially occlude the circumferential gap between adjacent inner seals 200. It can also be seen in the illustrated example of FIG. 7 that the projection 406 of side seal 400 and the wings 408 extending from the projection 406 can be disposed forward of the inner seals 200 and in particular the cloth extensions 212 of the inner seals 200, to substantially close off an axial gap between side seal 400 and inner seals 200 when the sealing arrangement is fully assembled.

Figure 8:
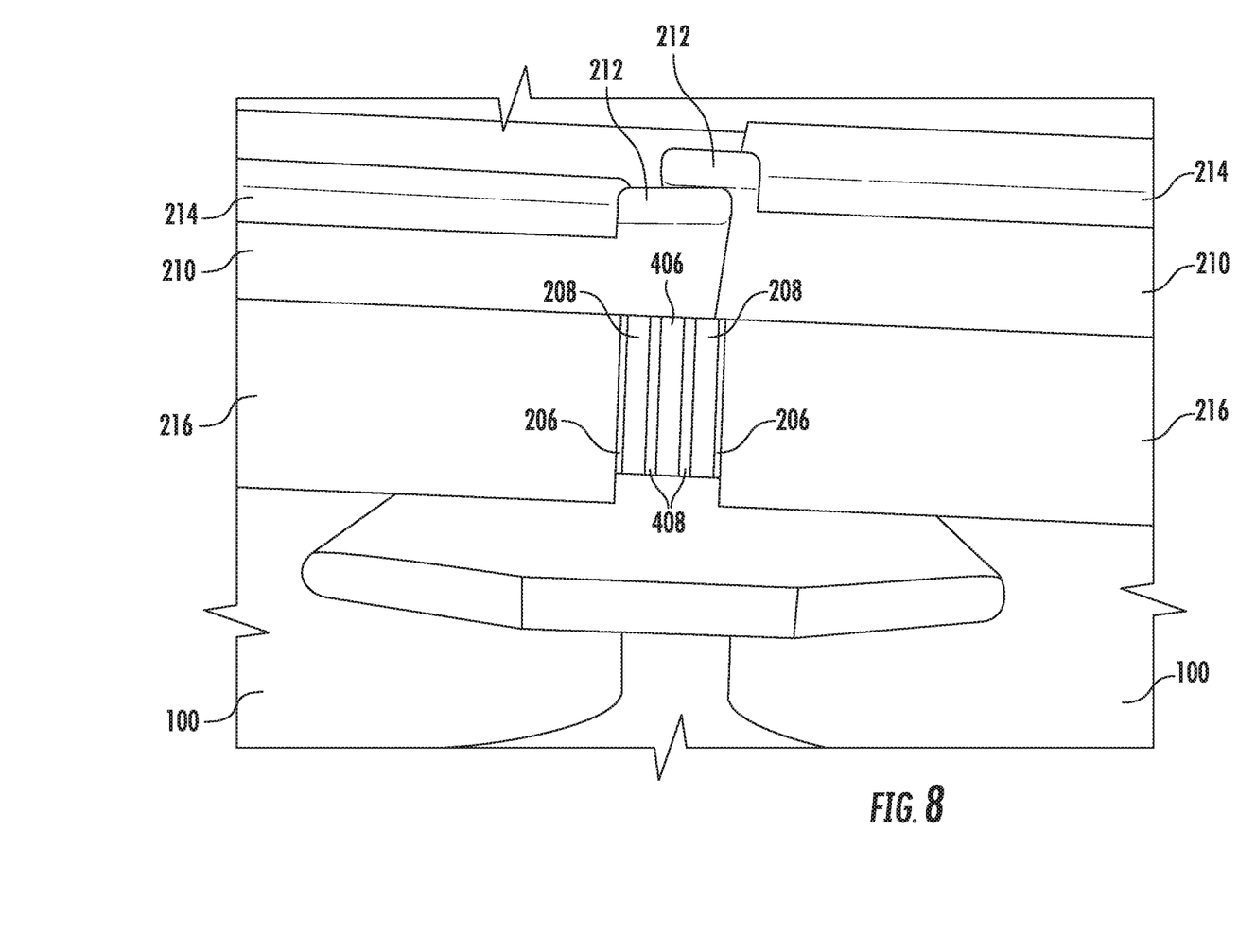
FIG. 8 is a radially oriented view of a sealing arrangement according to at least one embodiment.

FIG. 8 illustrates a radially outward-facing view of an exemplary sealing arrangement wherein side seal wings 408 interface with opposing wings 208 on each of a pair of circumferentially adjacent inner seals 200. Wings 408 can sealingly engage wings 208 to occlude flow of working fluid (e.g., compressed air 26) in a radial direction, while the overlapping cloth extensions 212 can prevent or limit bypass flow, i.e., working fluid 26 is prevented or limited from circumventing the wings 208 and 408 by passing over the wings 208 and 408. The term "over" in this instance meaning above with respect to the orientation illustrated in FIG. 8, which is also axially aft of the wings 208 and 408. Further, the pressure of compressed working fluid 26 energizes wings 208 and 408, i.e., the pressure biases inner seal wings 208 radially outward into sealing engagement with side seal wings 408. As such, while various embodiments may include predictable variations of the angle of the wings 208 and/or 408, it is advantageous for the wings 208 and/or 408 to be arranged so as to be energized by compressor flow 26.

Figure 9:
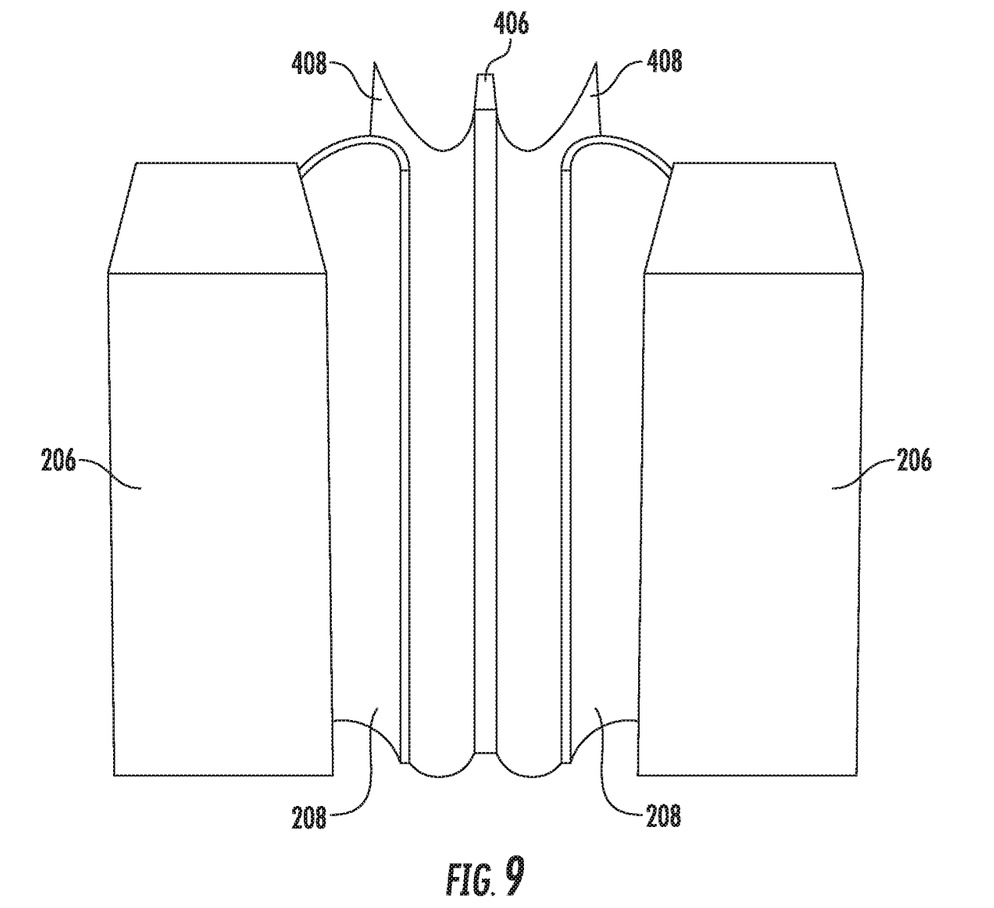
FIG. 9 is a partial perspective view of a sealing arrangement according to at least one embodiment.

FIG. 9 illustrates exemplary inner seal projections 206 and wings 208 in relation to exemplary side seal projection 406 and wings 408. The projections 206, 406 and wings 208, 408 are depicted in isolation (i.e., other elements of side seal 400 and inner seals 200 are omitted) in FIG. 9 for clarity of illustration. The exemplary components depicted in FIG. 9 are oriented such that the axial direction is vertical in the illustration of FIG. 9. The exemplary projections 206, 406 and wings 208, 408 of FIG. 9 may be usable with inner seals 200 and side seal 400 such as for example, those illustrated in FIG. 8, in which case aft portions of the projections 206, 406 and wings 208, 408 (which could be upper portions as illustrated in FIG. 9) would be at least partially occluded by the inner seals 210, and in particular the overlapping cloth extensions 212. In essence, the cloth extensions 212 provide a "top" to the wings 208, 408 to limit flow going over the tops of the flaps in the axial direction.

The present subject matter provides several advantages. For example, axial and circumferential gaps that remain when existing seals are used can be obstructed by the projections and wings while preserving installation tolerances, such as clearance between the more rigid portions of the circumferential seals. Obstructing these gaps results in a reduction in non-chargeable flow and better engine performance can be achieved. As another example advantage, the improved sealing arrangement can be implemented without modifying other components such as the aft frames or stage one nozzle. Thus, existing engines can be retrofitted with the improved seals at relatively low cost. The foregoing exemplary advantages are not exhaustive but are provided as examples only without limitation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. For example, the exemplary description in the foregoing pertaining to the inner corners of the aft frame can also be implemented at one or more outer corners of the aft frame as well as or instead of the inner corner(s). Such other examples are intended to be within the scope of the claims if they include structural elements that do not differ from the literal language of the claims, or if they include equivalent structural elements with insubstantial differences from the literal language of the claims.

What is claimed is:

1. A sealing arrangement for sealing between a first stage nozzle and a plurality of aft frames in a gas turbine, the gas turbine comprising a shaft extending along an axial direction, the gas turbine defining a radial direction perpendicular to the axial direction and a circumferential direction extending around the axial direction, comprising:
    a first seal which is circumferentially oriented, the first seal comprising a forward surface, an aft surface, and a wing extending radially inward at an oblique angle;
    a second seal which is circumferentially oriented adjacent to the first seal, the second seal comprising a forward surface, an aft surface, and a wing extending radially inward at an oblique angle, the second seal radially and axially aligned with the first seal, the wing of the second seal opposing the wing of the first seal and circumferentially spaced from the wing of the first seal; and
    a side seal radially disposed between the first seal and the second seal;
    wherein the side seal comprises a forward face and an aft face, a first wing extending radially outward at an oblique angle and a second wing extending radially outward at an oblique angle;
    wherein the first wing of the side seal sealingly interfaces with the wing of the first seal and the second wing of the side seal sealingly interfaces with the wing of the second seal.

2. The sealing arrangement of claim 1, wherein the first seal comprises a first cloth extension and the second seal comprises a second cloth extension.

3. The sealing arrangement of claim 2, wherein the first cloth extension extends circumferentially beyond the wing of the first seal and the second cloth extension extends circumferentially beyond the wing of the second seal.

4. The sealing arrangement of claim 2, wherein the first seal comprises a cloth material and one or more shims, the first cloth extension contiguous with the cloth material and extending circumferentially beyond the one or more shims, and wherein the second seal comprises a cloth material and one or more shims, the second cloth extension contiguous with the cloth material of the second seal and extending circumferentially beyond the one or more shims of the second seal.

5. The sealing arrangement of claim 4, wherein the first seal further comprises a first elongate backing bar along the forward surface of the first seal and a projection extending axially forward from the forward surface of the first seal at an end of the first backing bar, the wing of the first seal extending from an outer portion of the projection of the first seal, and wherein the second seal further comprises a second elongate backing bar along the forward surface of the second seal and a projection extending axially forward from the forward surface of the second seal at an end of the second backing bar, the wing of the second seal extending from an outer portion of the projection of the second seal.

6. The sealing arrangement of claim 5, wherein the first cloth extension extends circumferentially beyond the wing of the first seal and the second cloth extension extends circumferentially beyond the wing of the second seal such that the first cloth extension and the second cloth extension overlap aft of the wing of the first seal and the wing of the second seal.

7. The sealing arrangement of claim 1, wherein the first seal further comprises a projection extending axially forward from the forward surface of the first seal, the wing of the first seal extending from an outer portion of the projection of the first seal, and wherein the second seal further comprises a projection extending axially forward from the forward surface of the second seal, the wing of the second seal extending from an outer portion of the projection of the second seal.

8. The sealing arrangement of claim 1, wherein the side seal further comprises a projection on the aft face of the side seal, the projection extending axially aft from the aft face of the side seal, the first wing extending from an inner portion of the projection and the second wing extending from an inner portion of the projection.

9. The sealing arrangement of claim 8, wherein the projection of the side seal further comprises a first face defining an axial width and a radial height and a second face opposing the first face and circumferentially spaced from the first face, the second face defining an axial width and a radial height, the first wing extending from an inner portion of the first face and the second wing extending from an inner portion of the second face.

10. A gas turbine, comprising:
    a compressor;
    a turbine; and
    a plurality of combustors disposed downstream from the compressor and upstream from the turbine, the plurality of combustors circumferentially spaced around a central axis of the turbine, each combustor of the plurality of combustors comprising:
an upstream end;
a downstream end;
a transition duct which defines a flow path from a respective combustor of the plurality of combustors to the turbine; and
an aft frame that circumferentially surrounds the downstream end of the transition duct, the aft frame comprising an inner portion radially separated from an outer portion and a pair of opposing side portions that extend radially between the inner portion and the outer portion;
a first inner seal disposed on the inner portion of the aft frame of a first combustor of the plurality of combustors;
a second inner seal disposed on the inner portion of the aft frame of a circumferentially adjacent combustor of the plurality of combustors to the first combustor of the plurality of combustors; and
a side seal radially disposed between the first inner seal and the second inner seal;
wherein the first inner seal comprises a forward surface, an aft surface, and a first wing extending radially inward at an oblique angle;
wherein the second inner seal comprises a forward surface, an aft surface, and a second wing extending radially inward at an oblique angle, the second inner seal radially and axially aligned with the first inner seal, the second wing opposing and circumferentially spaced from the first wing;
wherein the side seal comprises a forward face and an aft face, a third wing extending radially outward at an oblique angle and a fourth wing extending radially outward at an oblique angle; wherein the third wing sealingly interfaces with the first wing and the fourth wing sealingly interfaces with the second wing.

11. The gas turbine of claim 10, wherein the first inner seal comprises a first cloth extension and the second inner seal comprises a second cloth extension.

12. The gas turbine of claim 11, wherein the first inner seal comprises a cloth material and one or more shims, the first cloth extension contiguous with the cloth material and extending circumferentially beyond the one or more shims, and wherein the second inner seal comprises a cloth material and one or more shims, the second cloth extension contiguous with the cloth material of the second seal and extending circumferentially beyond the one or more shims of the second seal.

13. The gas turbine of claim 12, wherein the first inner seal further comprises a first elongate backing bar along the forward surface of the first inner seal and a first projection extending axially forward from the forward surface of the first inner seal at an end of the first backing bar, the first wing extending from an outer portion of the first projection, and wherein the second inner seal further comprises a second elongate backing bar along the forward surface of the second inner seal and a second projection extending axially forward from the forward surface of the second inner seal at an end of the second backing bar, the second wing extending from an outer portion of the second projection.

14. The gas turbine of claim 13, wherein the side seal further comprises a third projection on the aft face of the side seal, the third projection extending axially aft from the aft face of the side seal, the third wing extending from an inner portion of the third projection and the fourth wing extending from an inner portion of the third projection.

15. The gas turbine of claim 14, wherein the third projection further comprises a first face defining an axial width and a radial height and a second face opposing the first face and circumferentially spaced from the first face, the second face defining an axial width and a radial height, the third wing extending from an inner portion of the first face and the fourth wing extending from an inner portion of the second face.

16. The gas turbine of claim 15, wherein the first cloth extension extends circumferentially beyond the first wing and the second cloth extension extends circumferentially beyond the second wing such that the first cloth extension and the second cloth extension overlap.

17. The gas turbine of claim 16, wherein the third projection is axially aligned with the first and second projections, with the first and second cloth extensions overlapping axially aft thereof.

18. The gas turbine of claim 17, wherein the first, second, third, and fourth wings are disposed in a radial flow path of compressed working fluid for biasing the first and third wings into sealing engagement by a radial flow of the compressed working fluid within the radial flow path of the compressed working fluid and for biasing the second and fourth wings into sealing engagement by the radial flow of the compressed working fluid.

* * * * *